United States Patent [19]
Mouri

[11] Patent Number: 5,579,169
[45] Date of Patent: Nov. 26, 1996

[54] UNDERWATER WIDE ANGLE LENS

[75] Inventor: Motohisa Mouri, Yokohama, Japan

[73] Assignee: Nikon Corporation, Tokyo, Japan

[21] Appl. No.: 302,476

[22] Filed: Sep. 12, 1994

[30] Foreign Application Priority Data

Sep. 13, 1993 [JP] Japan ................................. 5-249682

[51] Int. Cl.⁶ .................................................. G02B 15/14
[52] U.S. Cl. ................................. 359/682; 359/762
[58] Field of Search ................................. 359/682, 684,
359/725, 755, 756, 762, 680, 754

[56] References Cited

U.S. PATENT DOCUMENTS

| | | | |
|---|---|---|---|
| 3,737,214 | 6/1973 | Shimizu | 359/754 |
| 4,099,845 | 7/1978 | Takesi et al. | 359/684 |
| 4,540,249 | 9/1985 | Mogami | 359/680 |
| 5,325,236 | 6/1994 | Tanaka | 359/689 |

*Primary Examiner*—Georgia Y. Epps
*Assistant Examiner*—Dawn-Marie Bey
*Attorney, Agent, or Firm*—Shapiro and Shapiro

[57] ABSTRACT

An underwater wide angle lens is provided, in succession from the object side, with a fore group comprising a first lens group having negative refractive power, a second lens group having negative refractive power, a third lens group having negative refractive power, and a fourth lens group having positive refractive power, and a rear group comprising a fifth lens group having positive refractive power and a sixth lens group having positive refractive power. Preferably, the fifth lens group and/or the sixth lens group is a cemented lens and focusing is effected by one or more of the second to sixth lens groups. Preferably each of the first lens group, the second lens group and the third lens group is a meniscus lens having its convex surface facing the object side.

8 Claims, 3 Drawing Sheets

UNDERWATER WIDE ANGLE LENS

BACKGROUND OF THE INVENTION

1. Field of the Invention

This invention relates to an underwater wide angle lens.

2. Related Background Art

When photographing which requires a wide angle of field of about 180 is to be effected under water, a land camera and a fish-eye lens have heretofore been used and photographing has been effected with these contained in a semispherical underwater housing.

However, when a camera having a land fish-eye lens mounted thereon is used under water while being contained in an underwater housing, aberrations including astigmatism have been created in the inner and outer boundary surfaces of the semispherical underwater housing and therefore, the imaging performance of the fish-eye lens has been Greatly reduced.

Also, when underwater photographing is effected with a fish-eye lens which is similar in lens construction to a land lens being mounted on a camera within an underwater housing, the medium on the object side turns from air into water and the refractive index of the object side becomes Greater than that of the image side and therefore, the focal length of the lens increases in conformity with the ratio (about 1.33 times) of refractive index of water to air and as compared with the specification during use on land, a reduction in the photographing angle of field under water occurs and therefore, wide image photographing has been impossible and the feature of the fish-eye lens which is a wide angle of field has been spoiled.

On the other hand, in order to eliminate various problems including not only reductions in various optical performances caused by a land lens being used under water by the use of an underwater housing, but also a reduction in operability caused by a camera body being hermetically sealed in the underwater housing, a single-lens reflex camera exclusively for underwater use which is endowed with a waterproof function has been developed and along therewith, there is a demand for an underwater wide angle lens having a waterproof function which can be mounted on such a single-lens reflex camera exclusively for underwater use.

SUMMARY OF THE INVENTION

The present invention intends to provide an underwater wide angle lens which does not use an underwater housing and which is mountable on an underwater single-lens reflex camera fit for underwater photographing and has a waterproof function and an excellent optical performance, and particularly an underwater wide angle lens which can secure a photographing angle of field of about 180° under water and moreover has a good imaging performance having little aberration from infinity to a close distance at such angle of field.

The basic construction of the underwater wide angle lens according to the present invention for achieving the above object comprises, in succession from the object side, a fore group comprised of a first lens group having negative refractive power, a second lens group having negative refractive power, a third lens group having negative refractive power, and a fourth lens group having positive refractive power, and a rear group comprised of a fifth lens group having positive refractive power, and a sixth lens group having positive refractive power.

In the underwater wide angle lens of the present invention, the first lens group disposed most adjacent to the object side and contacting with water has negative refractive power so as to be capable of condensing a beam of light of a wide angle of field of about 180° under water.

The second lens group and the third lens group each have negative refractive power sufficient to secure a relatively long back focal length by the inter position of a quick return mirror when the underwater wide angle lens is mounted on a single-lens reflex camera. The aberrations of the beam of light of a wide angle of field introduced by the first lens group are corrected by the second and third lens groups.

By adopting such a construction in the first to third lens groups, composite negative refractive power is strengthened, whereby a beam of light of a wide angle of field is introduced and yet a strong diverging action is given to a paraxial beam of light and the divergent beam of light is gradually converged by the rear group having positive refractive power to thereby secure a back focal length about three times as long as the focal length and fit the underwater wide angle lens of the present invention as a wide angle lens for an underwater single-lens reflex camera.

The fourth lens group provided on the image side of the third lens group is made to have positive refractive power. By the positive refractive power of the fourth lens group as opposed to the negative refractive power of the first to third lens groups, Petzval sum is corrected to thereby correct astigmatism and image plane distortion. Also, in the present invention, a stop is disposed on the image side of the fourth lens group, and the first to fourth lens groups together constitute the fore group.

The fifth and sixth lens groups disposed in the named order as the rear group on the image side of said stop are made to have positive refractive power. The fifth lens group and/or the sixth lens group comprises a cemented lens.

Where use is made of such a cemented lens consisting of a positive lens and a negative lens, it is preferable to make the refractive index of the negative lens greater than the refractive index of the positive lens in order to correct negative Petzval sum created by the first to third lens groups having negative refractive power. Also, it is preferable to make the Abbe number of the positive lens greater than that of the negative lens in order to correct chromatic aberration of magnification created by the negative refractive power of the first to third lens groups.

In the underwater wide angle lens according to the present invention, it is possible to select several focusing methods. For example, it is possible to adopt any of a method of axially moving the whole lens system toward the object side and a focusing method of fixing the first lens group to thereby keep the full length of the lens system constant and yet moving the remaining lens groups integrally toward the object side. In this case, a waterproof mechanism fit for the focusing method adopted can be adopted.

It is also possible to use one or more of the fourth lens group having positive refractive power near the stop, the fifth lens group and the sixth lens group to provide a focusing group, and move it toward the object to thereby accomplish focusing. In such case, it is necessary to make the lens barrel into a double structure as a waterproof mechanism.

In the present invention, it is preferable to make the first lens group into a meniscus lens having its convex surface facing the object side, and make the meniscus shape thereof into a semispherical shape (called a concentric circular shape) in which the curvature of the object side and the curvature of the image side have substantially the same center of curvature. If this is done, the entrance surface of the first lens group will become substantially perpendicular to each incident beam of light including a beam of light of a wide angle of field and therefore, various aberrations attributable to the angle of incidence which are created in the entrance surface can be made small. Also, by making the meniscus shape into a substantially concentric circular shape, a force acting by water pressure is uniformly dispersed in the direction of the thickness of the lens and thus, a pressure resisting performance as a waterproof window can be enhanced.

However, it is difficult in reality to work such a substantially concentric circular lens surface that the entrance surface of the first lens group is perpendicular to the incident beam of light over the whole area of a wide angle of view of about 180°. Also, the first lens group has a waterproof function and a pressure resisting function in addition to aberration correction and therefore, it is necessary to make the lens thickness thereof great. Accordingly, if the radius of curvature of the lens surface is made too great in order to reduce negative image plane distortion created in the first lens group, the volume of the whole lens system will increase, thus resulting in a bulky lens unsuitable for underwater use, and this is not desirable.

Further, it is also preferable that each of the second lens group and the third lens group be a meniscus lens having its convex surface facing the object side in order to suppress the creation of spherical aberration and astigmatism of marginal rays.

With such circumstances taken into account, an advantageous mode of practicality and realizability satisfies, in addition to the afore described construction of the present invention, the following conditional expression (1):

$$0.75<|f_t|/F<0.85, \qquad (1)$$

where $f_t$ is the combined focal length of the first to third lens groups, underwater and F is the underwater focal length of the whole lens system.

The above-mentioned conditional expression (1) prescribes the power to be possessed by the first to third lens groups as negative lenses in order to image a beam of light of a wide angle of field even under water and maintain a short focal length under water. If the lower limit of conditional expression (1) is exceeded, the combined negative refractive power of the first to third lens groups will become deficient and the divergence of paraxial rays will become insufficient and thus, it will become impossible to obtain a back focal length about three times as great as the focal length and also, it will become impossible to converge a beam of light of a wide angle of field sufficiently and therefore, the angle of field will narrow and it will become impossible to obtain a photographing angle of field of about 180°.

Also, if the upper limit of conditional expression (1) is exceeded, the negative refractive power of the first to third lens groups will become strong and therefore, the back focal length will become long and it will become possible to converge a beam of light of a wide angle of field of 90° or greater, but spherical aberration and chromatic aberration of magnification of marginal rays created by too strong negative refractive power of the first to third lens groups will become difficult to correct by the real group, and if for this reason, the construction of the lens groups having positive refractive power in the rear group is made complicated, it will result in the bulkiness of the wide angle lens and a reduction in the quantity of marginal light.

As described above, the present invention realizes an underwater wide angle lens which satisfies conditional expressions (1) to thereby secure a back focal length about three times as great as the focal length necessary as a wide angle lens for use with a single-lens reflex camera, and which maintains an angle of field of about 180° under water and also simplifies the construction of the positive lens groups in the rear group to the utmost and has a good imaging performance in which various aberrations are suppressed.

Further, in the present invention, it is desirable to satisfy the following conditional expressions (2) and (3) concurrently:

$$-6.5<q<-4.5 \qquad (2)$$

$$n_1<1.6 \qquad (3)$$

where q is the shape factor of the first lens group, and $n_1$ is the refractive index of the first lens group.

Conditional expression (2) limits the shape of the first lens group and here, the shape factor q is expressed as $q=(r_2+r_1)/(r_2-r_1)$ by the radius of curvature $r_1$ of the object side lens surface of the first lens group and the radius of curvature $r_2$ of the image side lens surface of the first lens group. If the lower limit of this conditional expression (2) is exceeded, the meniscus shape of the first lens group will depart from the aforementioned concentric circular shape and aberrations will be greatly created in the area of a wide angle of field and they will become difficult to correct by the second and subsequent lens groups.

Also, if the upper limit of conditional expression (2) is exceeded, the meniscus shape of the first lens group will approximate to the concentric circular shape and the amount of aberrations created could be reduced, but the manufacture, working, etc. of the lens will become difficult and realizability will suffer. Also, the radius of curvature of the first lens group will become large, and practicality will suffer as previously mentioned.

Further, the upper limit of conditional expression (3) is exceeded, the difference in refractive index between the first lens group and water will become great and when the first lens group is not of an ideal spherical shape, aberrations created in the boundary surface with water in the area of a wide angle of field will become great and the aberrations will become difficult to correct by the second and subsequent lens groups.

Also, in the present invention, to enhance the imaging performance of the whole lens system, it is desirable to satisfy the following conditional expression (4):

$$0.25<f_2/f_1<0.45, \qquad (4)$$

where $f_1$ is the focal length of the first lens group, and $f_2$ is the focal length of the second lens group.

If the lower limit of the above-mentioned conditional expression (4) is exceeded, image plane distortion created in the first lens group will become small, but the diameter of the first lens group will become large to increase the volume of the lens and practicality will suffer. Also, if the upper limit of conditional. expression (4) is exceeded, the diameter of the first lens group could be reduced, but negative image plane distortion will be created in a great deal and will become difficult to correct.

Further, in the present invention, to enhance the imaging performance of the whole lens system, it is desirable that the fourth lens group be comprised of a cemented lens consisting of a positive lens and a negative lens. In this case, if the refractive index of the negative lens is made greater than the refractive index of the positive lens, Petzval sum could be corrected to the positive. In this case, it is desirable to satisfy the following conditional expression (5):

$$n_{42}-n_{41}>0.15, \qquad (5)$$

where $n_{41}$ is the refractive index of the positive lens, and $n_{42}$ is the refractive index of the negative lens.

Further, it is desirable that the surface of the negative lens which is most adjacent to the step be of a shape having its concave surface facing the object side. Thereby, inner coma in the area of a wide angle of field created in the first to third lens groups having negative refractive power can be corrected.

Also, in the present invention, it is beneficial to introduce aspherical surfaces into the lens surfaces of some lens groups. Particularly, by making the image side lens surfaces of the first to third lens groups into aspherical surfaces, the correction of coma and distortion in the area of a wide angle of field can be effected advantageously.

The above and other objects, features and advantages of the present invention will be explained hereinafter and may be better understood by reference to the accompanying drawings and the descriptive matter which follows.

DETAILED DESCRIPTION OF THE PREFERRED EMBODIMENTS

Figure 1:
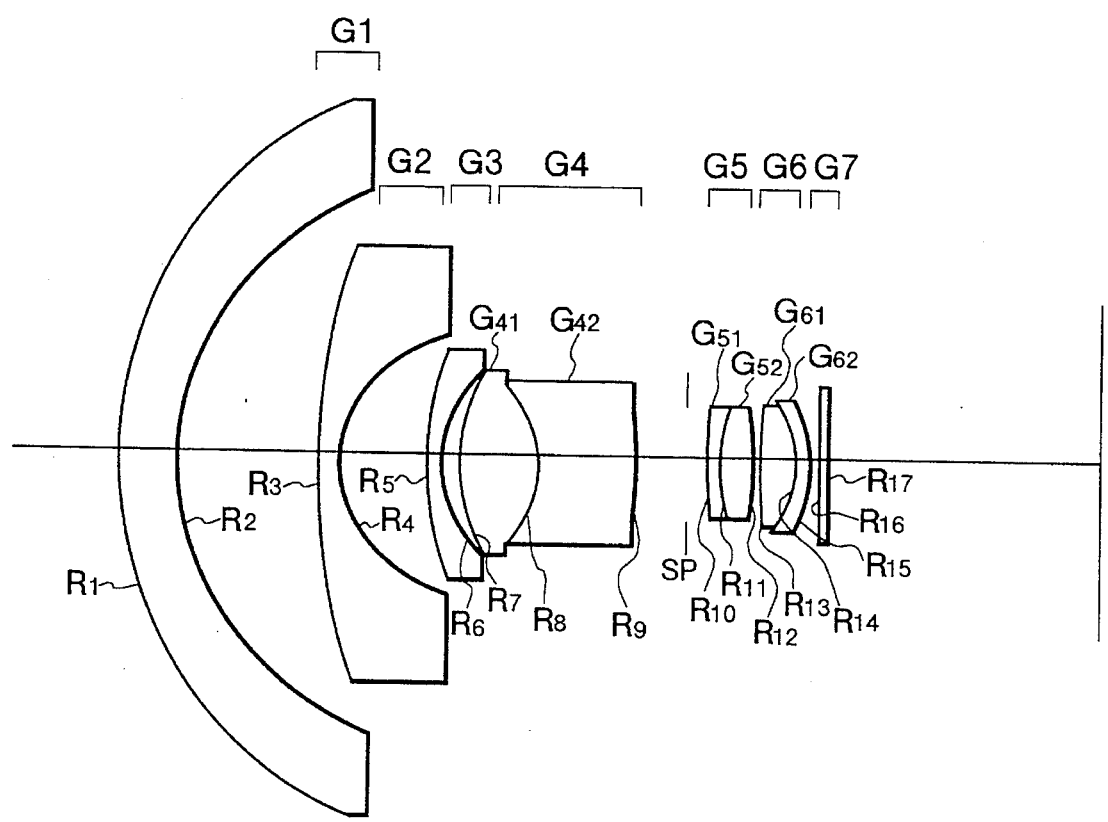
FIG. 1 is an illustration schematically showing the construction of an underwater wide angle lens according to a first embodiment of the present invention.

FIG. 1 is an illustration schematically showing the construction of an underwater wide angle lens according to a first embodiment of the present invention. In the underwater wide angle lens according to this embodiment, in succession from the object side, a fore group is constituted by a first lens group G1 of a meniscus shape having its convex surface facing the object side and having negative refractive power, a second lens group G2 of a meniscus shape having its convex surface facing the object side and having negative refractive power, a third lens group G3 of a meniscus shape having its convex surface facing the object side and having negative refractive power, and a fourth lens group G4 having positive refractive power, and a rear group is constituted by a fifth lens group G5 comprising a cemented lens having positive refractive power, and a sixth lens group G6 comprising a cemented lens having positive refractive power. A stop SP is disposed between the fourth lens group G4 and the fifth lens group G5.

In the first embodiment, the meniscus shape of the first lens group G1 is approximated to a concentric circular shape so that a beam of light from an object may enter the entrance surface as perpendicularly as possible thereto in all the range of the effective angle of field of the lens. The second lens group G2 and the third lens group G3 each is a meniscus single lens having negative refractive power and having its convex surface facings the object side. The fourth lens group G4 comprises a biconvex lens G41 having positive refractive power and having positive refractive power on the object side, and a meniscus lens G42 having its concave surface facing the object side and having negative refractive power, the lenses G41 and G42 being cemented together.

The fifth lens group G5 comprises a cemented lens having positive refractive power in which a meniscus lens G51 having negative refractive power is disposed on the object side and a biconvex lens G52 having positive refractive power is disposed on the image side, the cemented surface of the lenses G51 and G52 being a convex surface facing the object side.

The sixth lens group G6 also is a cemented lens having positive refractive power, but conversely to the fifth lens group G5, it is of a construction in which a biconvex lens G61 having positive refractive power is disposed on the object side and a meniscus lens G62 having negative refractive power is disposed on the image side, the cemented surface of the lenses G61 and G62 being a concave surface facing the object side.

A seventh lens group G7 may comprise a plane parallel plate and may be omitted, but can be utilized as a filter or a waterproof window. In the first lens group G1 to the third lens group G3, the virtual image of an underwater object is formed with little aberrations from object light which has entered at a photographing angle of field of about 180°, and an object image is formed on the image plane while a long back focal length is kept by the fourth lens group G4 to the sixth lens group G6.

Various elements in the design values of the underwater wide angle lens according to the first embodiment are shown in Table 1 below. In Table 1, $R_i$ represents each lens surface shown in FIG. 1, $r_i$ represents the radius of curvature of the lens surface $R_i$, $d_i$ represents the surface spacing on the optical axis between the lens surface $R_i$ and the lens surface $R_{i+1}$, $n_i$ represents the refractive index of the medium between the lens surface $R_i$ and the lens surface $R_{i+1}$ for d-ray ($\lambda=587.6$ nm), and $v_i$ represents the Abbe number of the medium between the lens surface $R_i$ and the lens surface $R_{i+1}$. F indicates the focal length of the whole system, under water FNO indicates F-number, $\omega$ indicates a half angle of field, $2\omega$ indicates the full angle of field, and Bf indicates the back focal length.

TABLE 1

| | F = 12.32, FNO = 2.87, 2ω = 170.6° | | | |
|---|---|---|---|---|
| $R_i$ | $r_i$ | $d_i$ | $v_i$ | $n_i$ |
| | (water) | | 53.98 | 1.33306 |
| $R_1$ | 54.988 | 8.00 | 64.1 | 1.51680 |
| $R_2$ | 39.999 | 20.00 | | |
| $R_3$ | 107.519 | 3.00 | 57.5 | 1.67025 |
| $R_4$ | 17.841 | 12.00 | | |
| $R_5$ | 62.107 | 2.30 | 55.6 | 1.69680 |
| $R_6$ | 17.236 | 2.40 | | |
| $R_7$ | 30.492 | 10.90 | 35.5 | 1.59507 |
| $R_8$ | −16.104 | 13.50 | 45.4 | 1.79668 |
| $R_9$ | −37.279 | 10.30 | | |
| $R_{10}$ | 77.9174 | 1.50 | 40.9 | 1.79631 |
| $R_{11}$ | 20.537 | 4.70 | 69.9 | 1.51860 |
| $R_{12}$ | −50.576 | 1.00 | | |
| $R_{13}$ | 76.226 | 5.20 | 69.9 | 1.51680 |
| $R_{14}$ | −16.237 | 1.50 | 25.3 | 1.80518 |
| $R_{15}$ | −23.312 | 1.50 | | |
| $R_{16}$ | ∞ | 1.20 | 64.1 | 1.51680 |
| $R_{17}$ | ∞ | (Bf) | | |

Also, condition-corresponding values in the underwater wide angle lens according to the first embodiment are as follows and satisfy the respective conditions.

| Expression (1) | $|f_1/F| = 0.83$ |
| --- | --- |
| Expression (2) | $q = -6.33$ |
| Expression (3) | $n_1 = 1.52$ |
| Expression (4) | $f_1/f_2 = 0.30$ |
| Expression (5) | $n_{42} - n_{41} = 0.20$ |

Figure 2:
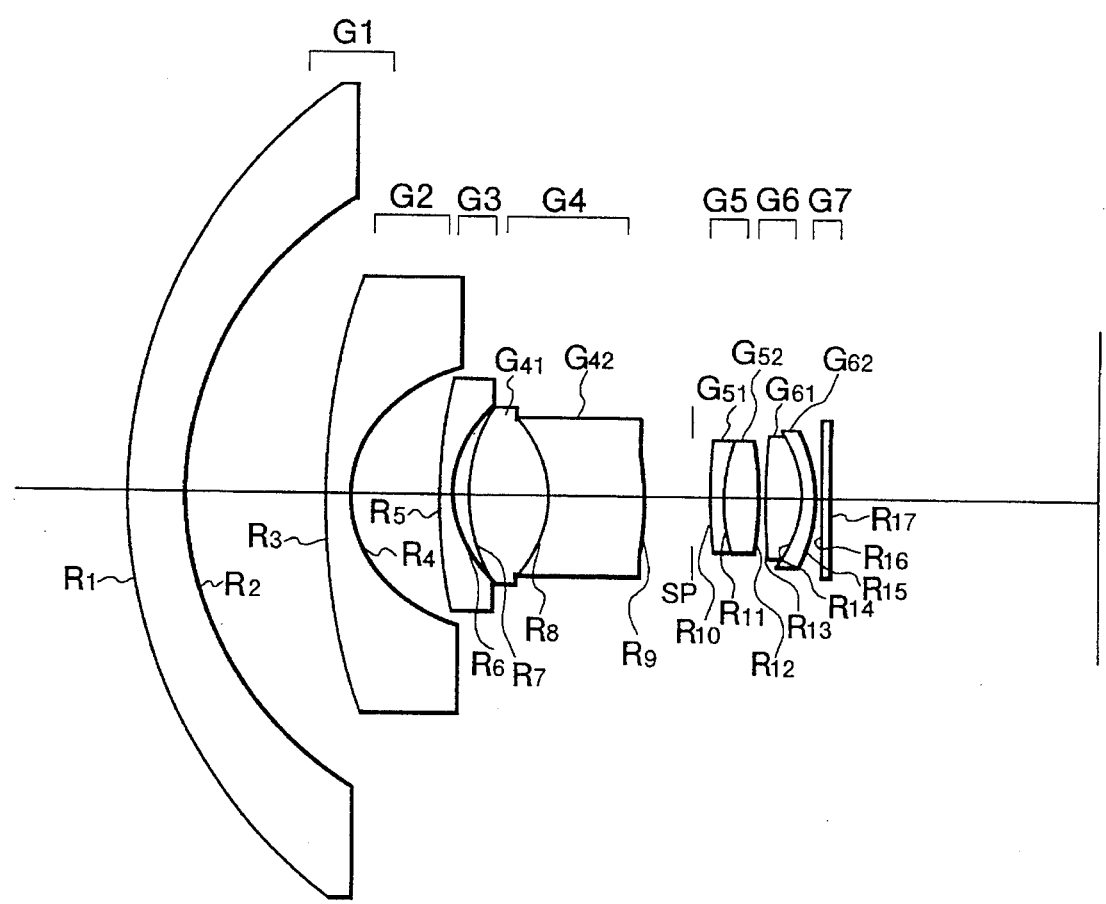
FIG. 2 is an illustration shematically showing the construction of an underwater wide angle lens according to a second embodiment of the present invention.

FIG. 2 is an illustration schematically showing an underwater wide angle lens according to a second embodiment of the present invention. The main lens construction of the second embodiment shown in FIG. 2 is substantially similar to the lens construction of the first embodiment shown in FIG. 1.

In the second embodiment, the material of the first lens group G1 is plastic so that the angle of field under water may be 180°. As compared with the first embodiment, the refractive power of the first lens group G1 becomes small and therefore the effective diameter of the first lens group G1 is larger than in the first embodiment, but a beam of light of a wider angle of field can be made to enter the first lens group.

Various elements in the design values of the underwater wide angle lens according to the second embodiment are shown in Table 2 below. In Table 2, $R_i$ represents each lens surface shown in FIG. 2, $r_i$ represents the radius of curvature of the lens surface $R_i$, $d_i$ represents the surface spacing on the optical axis between the lens surface $R_i$ and the lens surface $R_{i+1}$, $n_i$ represents the refractive index of the medium between the lens surface $R_i$ and the lens surface $R_{i+1}$ for d-ray ($\lambda=587.6$ nm) and $v_i$ represents the Abbe number of the medium between the lens surface $R_i$ and the lens surface $R_{i+1}$. F indicates the focal length of the whole system, under water FNO indicates F-number, $\omega$ indicates a half angle of field, $2\omega$ indicates the full angle of field, and Bf indicates the back focal length.

TABLE 2

| | F = 12.49, FNO = 2.85, 2ω = 180.0° | | | |
| --- | --- | --- | --- | --- |
| $R_i$ | $r_i$ | $d_i$ | $v_i$ | $n_i$ |
| | (water) | | 53.98 | 1.33306 |
| $R_1$ | 70.000 | 8.00 | 57.5 | 1.49108 |
| $R_2$ | 39.999 | 20.00 | | |
| $R_3$ | 108.000 | 3.00 | 57.5 | 1.67025 |
| $R_4$ | 17.855 | 12.00 | | |
| $R_5$ | 74.492 | 2.30 | 55.6 | 1.69680 |
| $R_6$ | 16.828 | 2.40 | | |
| $R_7$ | 29.323 | 10.90 | 35.5 | 1.59507 |
| $R_8$ | −15.666 | 13.50 | 45.4 | 1.79668 |
| $R_9$ | −36.200 | 10.30 | | |
| $R_{10}$ | 77.574 | 1.50 | 40.9 | 1.79631 |
| $R_{11}$ | 20.537 | 4.70 | 69.9 | 1.51860 |
| $R_{12}$ | −50.576 | 1.00 | | |
| $R_{13}$ | 76.226 | 5.20 | 69.9 | 1.51680 |
| $R_{14}$ | −16.237 | 1.50 | 25.3 | 1.80518 |
| $R_{15}$ | −23.312 | 1.50 | | |
| $R_{16}$ | ∞ | 1.20 | 64.1 | 1.51680 |
| $R_{17}$ | ∞ | (Bf) | | |

Also, condition-corresponding values in the underwater wide angle lens according to the second embodiment are as follows and satisfy the respective conditions.

| Expression (1) | $|f_1/F| = 0.81$ |
| --- | --- |
| Expression (2) | $q = -5.36$ |
| Expression (3) | $n_1 = 1.49$ |
| Expression (4) | $f_1/f_2 = 0.25$ |
| Expression (5) | $n_{42} - n_{41} = 0.20$ |

Figure 3:
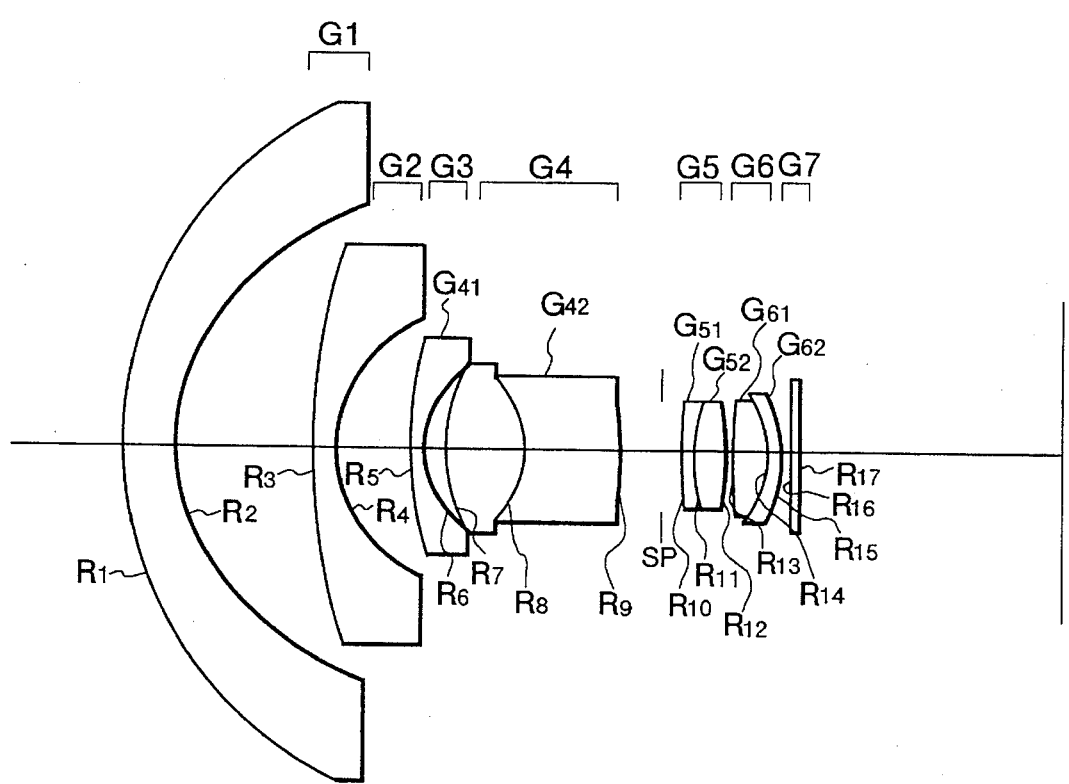
FIG. 3 is an illustration schematically showing the construction of an underwater wide angle lens according to a third embodiment of the present invention.

FIG. 3 is an illustration schematically showing the construction of an underwater wide angle lens according to a third embodiment of the present invention. The main lens construction of the third embodiment shown in FIG. 3 is substantially similar to the lens construction of the first embodiment shown in FIG. 1.

The third embodiment, conversely to the second embodiment, is one in which the negative refractive power of the first lens group G1 is made great. The great refractive power of the first lens group G1 leads to the advantage that the lens diameter of the first lens group G1 can be made small. However, when as previously described, there is adopted the focusing method in which the first lens group G1 and the seventh lens group G7 are fixed and the second lens group G2 to the sixth lens group G6 are moved together, the focusing group comes close to the first lens group G1 and therefore, it is not desirable to make the lens diameter of the first lens group G1 extremely small.

Various elements in the design values of the underwater wide angle lens according to the third embodiment are shown in Table 3 below. In Table 3, $R_i$ represents each lens surface shown in FIG. 3, $r_i$ represents the radius of curvature of the lens surface $R_i$, $d_i$ represents the surface spacing on the optical axis between the lens surface $R_i$ and the lens surface $R_{i+1}$, $n_i$ represents the refractive index of the medium between the lens surface $R_i$ and the lens surface $R_{i+1}$ for d-ray ($\lambda=587.6$ nm), and $v_i$ represents the Abbe number of the medium between the lens surface $R_i$ and the lens surface $R_{i+1}$. F indicates the focal length of the whole system, under water FNO indicates F-number, $\omega$ indicates a half angle of field, $2\omega$ indicates the full angle of field, and Bf indicates the back focal length.

TABLE 3

| | F = 12.10, FNO = 2.85, 2ω = 166.8° | | | |
| --- | --- | --- | --- | --- |
| $R_i$ | $r_i$ | $d_i$ | $v_i$ | $n_i$ |
| | (water) | | 53.98 | 1.33306 |
| $R_1$ | 54.988 | 8.00 | 64.1 | 1.51680 |
| $R_2$ | 35.000 | 20.00 | | |
| $R_3$ | 108.352 | 3.00 | 57.5 | 1.67025 |
| $R_4$ | 20.488 | 10.00 | | |
| $R_5$ | 62.107 | 2.30 | 55.6 | 1.69680 |
| $R_6$ | 15.459 | 3.50 | | |
| $R_7$ | 30.100 | 10.90 | 35.5 | 1.59507 |
| $R_8$ | −16.467 | 13.50 | 45.4 | 1.79668 |
| $R_9$ | −37.374 | 10.30 | | |
| $R_{10}$ | 77.574 | 1.50 | 40.9 | 1.79631 |
| $R_{11}$ | 20.537 | 4.70 | 69.9 | 1.51860 |
| $R_{12}$ | −50.576 | 1.00 | | |
| $R_{13}$ | 76.226 | 5.20 | 69.9 | 1.51680 |
| $R_{14}$ | −16.237 | 1.50 | 25.3 | 1.80518 |
| $R_{15}$ | −23.312 | 1.50 | | |
| $R_{16}$ | ∞ | 1.20 | 64.1 | 1.51680 |
| $R_{17}$ | ∞ | (Bf) | | |

Also, condition-corresponding values in the underwater wide angle lens according to the third embodiment are as follows and satisfy the respective conditions.

| Expression (1) | $|f_1/F| = 0.82$ |
| --- | --- |
| Expression (2) | $q = -4.50$ |
| Expression (3) | $n_1 = 1.52$ |
| Expression (4) | $f_1/f_2 = 0.43$ |
| Expression (5) | $n_{42} - n_{41} = 0.20$ |

Each of the first to third embodiments can adopt any of the focusing method of axially moving the whole lens system and the focusing method in which the first lens group G1 and the seventh lens group G7 are fixed and the second lens group G2 to the sixth lens group G6 are moved together toward the object side.

The focusing method in which the first lens group G1 and the seventh lens group G7 are fixed is advantageous in that the waterproof mechanism can be simplified. The seventh lens group G7 can also be used as a filter.

In the first to third embodiments, the medium on the object side is water and aberration correction is carried out for water, but the present invention is effective not only for water, but also for alcohol or the like.

Having described specific embodiments of the present invention, it is to be understood that any variations will occur to the mind of those skilled in the art within the scope of the invention as defined in the appended claims.

What is claimed is:

1. An underwater wide angle lens comprising, in succession from the object side, a fore group and a rear group, said fore group consisting of, in succession from the object side, a first lens group having negative refractive power, a second lens group having negative refractive power, a third lens group having negative refractive power and a fourth lens group having positive refractive power, and said rear group having, in succession from the object side, a fifth lens group having positive refractive power and a sixth lens group having positive refractive power, wherein at least one of said fifth lens group and said sixth lens group is a cemented lens, and focusing is effected by at least one of said second to sixth lens groups.

2. The wide angle lens of claim 1, wherein each of said first lens group, said second lens group and said third lens group is a meniscus lens having its convex surface facing the object side.

3. The wide angle lens of claim 2, satisfying the following condition:

$$0.75 < |f_i|/F < 0.85,$$

where $f_i$ is the combined focal length of said first to third lens groups, under water and F is the focal length of the whole lens system under water.

4. The wide angle lens of claim 3, further provided with on the image side of said sixth lens group, a plane parallel plate filter.

5. The wide angle lens of claim 1, wherein said fore group has negative refractive power, said rear group has positive refractive power and has an angle of field of 150° or greater, and negative distortion is created by said fore group, whereby chromatic aberration of magnification and curvature of image field are corrected.

6. The wide angle lens of claim 2, wherein said fore group has negative refractive power, said rear group has positive refractive power, and a stop is disposed between said fore group and said rear group.

7. An underwater wide angle lens comprising, in succession from the object side, a fore group and a rear group, said fore group consisting of, in succession from the object side, a first lens groupe having negative refractive power, a second lens group having negative refractive power, a third lens group having negative refractive power and a fourth lens group having positive refractive power, and said rear group having in succession from the object side, a fifth lens group having positive refractive power and a sixth lens group having positive refractive power, wherein all of the positive lens groups are comprised of cemented lenses, and focusing is effected by at least one of said second to sixth lens groups.

8. An underwater wide angle lens comprising, in succession from the object side, a fore group and a rear group, said fore group consisting of, in succession from the object side, a first lens group having negative refractive power, a second lens group having negative refractive power, a third lens group having negative refractive power and a fourth lens group having positive refractive power, and said rear group having, in succession from the object side, a fifth lens group having positive refractive power and a sixth lens group having positive refractive power, wherein all of the positive lens groups are comprised of cemented lenses, at least one of said cemented lenses is disposed in said fore group and at least two of said cemented lenses are disposed in said rear group.

* * * * *